(12) United States Patent
De Vriendt et al.

(10) Patent No.: US 9,154,819 B2
(45) Date of Patent: Oct. 6, 2015

(54) VIDEO CONTENT PRIORITY AWARE CONGESTION MANAGEMENT

(71) Applicant: CISCO TECHNOLOGY, INC., San Jose, CA (US)

(72) Inventors: Peter De Vriendt, Denderleeuw (BE); Carol Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 13/842,661

(22) Filed: Mar. 15, 2013

(65) Prior Publication Data

US 2014/0282776 A1 Sep. 18, 2014

(51) Int. Cl.
*H04N 21/24* (2011.01)
*H04N 21/647* (2011.01)
*H04N 21/231* (2011.01)
*H04N 21/2385* (2011.01)
*H04N 21/262* (2011.01)

(52) U.S. Cl.
CPC ............ *H04N 21/24* (2013.01); *H04N 21/2385* (2013.01); *H04N 21/23103* (2013.01); *H04N 21/2405* (2013.01); *H04N 21/26216* (2013.01); *H04N 21/26225* (2013.01); *H04N 21/64723* (2013.01); *H04N 21/64738* (2013.01)

(58) Field of Classification Search
CPC .............. H04N 21/2385; H04N 21/24; H04N 21/23103; H04N 21/2405; H04N 21/26216; H04N 21/64738; H04N 21/64723
USPC .......................................................... 725/95
See application file for complete search history.

(56) References Cited

U.S. PATENT DOCUMENTS

| | | | |
|---|---|---|---|
| 7,149,664 B1 * | 12/2006 | Firoiu et al. ...................... 703/2 |
| 8,839,317 B1 * | 9/2014 | Rieger et al. ..................... 725/87 |
| 2009/0025027 A1 * | 1/2009 | Craner ............................ 725/32 |
| 2010/0086020 A1 * | 4/2010 | Schlack .................... 375/240.01 |
| 2010/0241759 A1 * | 9/2010 | Smith et al. ................... 709/233 |
| 2010/0306353 A1 * | 12/2010 | Briscoe et al. ................ 709/221 |
| 2010/0306369 A1 * | 12/2010 | Riley ............................. 709/224 |
| 2011/0219411 A1 * | 9/2011 | Smith ............................ 725/109 |
| 2012/0218887 A1 | 8/2012 | Khilnani et al. |
| 2014/0047485 A1 * | 2/2014 | Shaw et al. ..................... 725/62 |

OTHER PUBLICATIONS

IETF RFC 2474, "Definition of the Differentiated Services Field (DS Field) in the IPv4 and IPv6 Headers", K. Nichols et al., Dec. 1998.
IETF RFC 2597, "Assured Forwarding PHB Group", J. Heinanen et al., Jun. 1999.

* cited by examiner

*Primary Examiner* — Ricky Chin
(74) *Attorney, Agent, or Firm* — Cindy Kaplan

(57) ABSTRACT

In one embodiment, a method includes assigning at a server, priority levels to channels associated with video broadcast content, transmitting the assigned priority levels to a network device transmitting the video broadcast content to receivers, and updating the assigned priority levels based on channel information received at the server. A policy is applied to the video broadcast content based on the assigned priority levels when network congestion occurs. An apparatus is also disclosed herein.

16 Claims, 3 Drawing Sheets

VIDEO CONTENT PRIORITY AWARE CONGESTION MANAGEMENT

TECHNICAL FIELD

The present disclosure relates generally to communication networks, and more particularly, to congestion management for video services.

BACKGROUND

In order to attract subscribers, providers of video services over IP (Internet Protocol) networks need to meet or exceed the video experience provided by existing services. The visual quality experience provided by IP networks may be impacted by many factors including packet loss due to network congestion.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
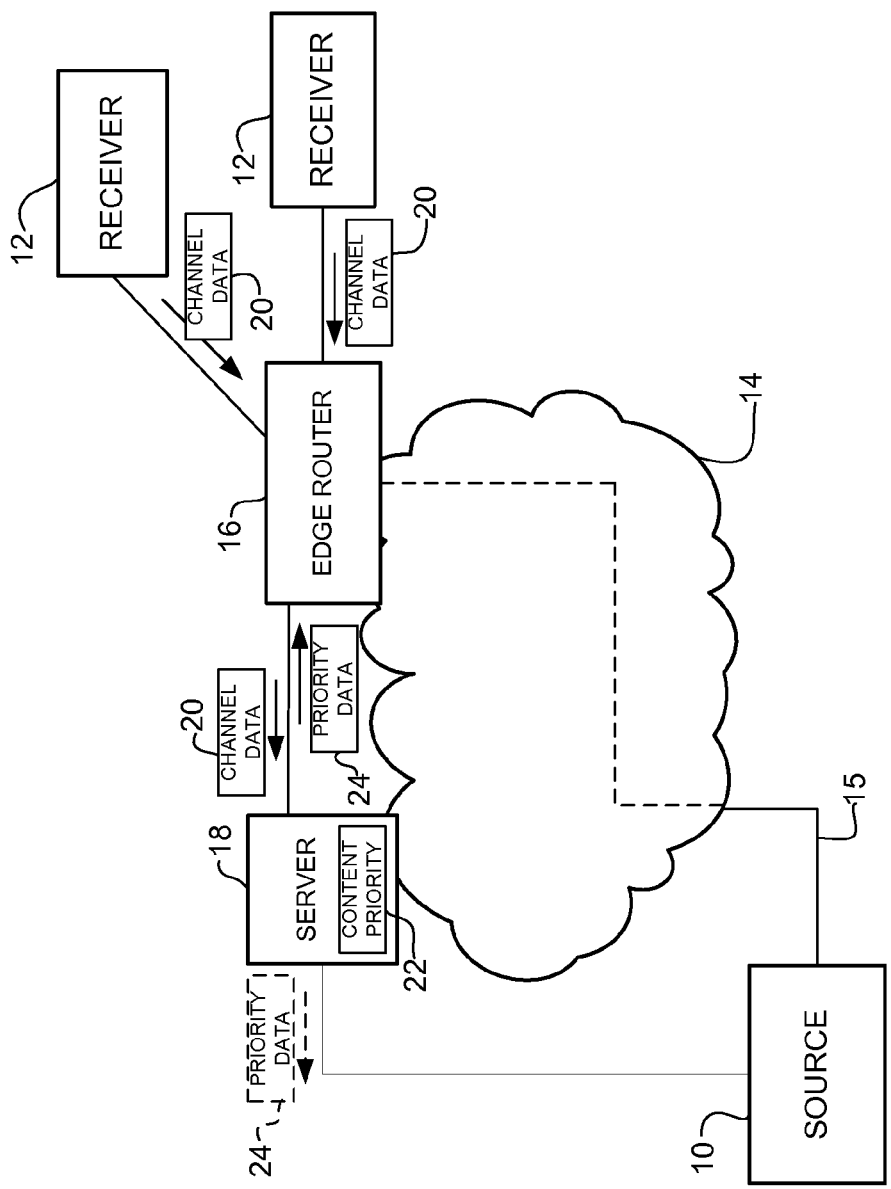
FIG. 1 illustrates an example of a network in which embodiments described herein may be implemented.

In one embodiment, a method generally comprises assigning at a server, priority levels to channels associated with video broadcast content, transmitting the assigned priority levels to a network device transmitting the video broadcast content to receivers, and updating the assigned priority levels based on channel information received at the server. A policy is applied to the video broadcast content based on the assigned priority levels when network congestion occurs.

In another embodiment, an apparatus generally comprises a processor for assigning at a server, priority levels to channels associated with video broadcast content, transmitting the assigned priority levels to a network device transmitting the video broadcast content to receivers, and updating the assigned priority levels based on channel information received at the server. The apparatus further includes memory for storing the assigned priority levels. A policy is applied to the video broadcast content based on the assigned priority levels when network congestion occurs.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network devices used to forward video traffic may forward tens or hundreds of channels based on the number of channels offered and the number of viewers interested in the channels. Popularity ranking charts, which categorize channels according to the number of receivers per channel at various points in time, provide power distribution for what is referred to as 'long tail content'. These charts have shown that a relatively small set of channels typically attract the majority of viewers, while the remaining channels (long tail) have relatively few receivers. The long tail content often consumes a large amount of bandwidth. This is because linear broadcast video is distributed in a multicast manner, wherein content is sent to a region even if it has only a single viewer.

In a conventional system, when the network device experiences congestion in a broadcast video class, it will drop packets from the class without regard to the importance of the video contained within the packets. This may impact the majority of viewers because both important and unimportant content is affected. Since the popularity of content is dynamic, a static QoS (Quality of Service) configuration is not sufficient.

The embodiments described herein allow a server to communicate information about the importance of video broadcast content to a network device, such as an edge router or a video source, so that action can be taken to preserve the quality of important content when the network experiences congestion. In one embodiment, a video caching server that has knowledge of video content popularity for a specific region assigns different priority levels to the channels (video streams) and communicates this to a router that can drop packets based on priority if there is congestion on the network links. This allows video quality of the most important content to be preserved, thereby resulting in higher customer satisfaction.

Referring now to the drawings, and first to FIG. 1, an example of a network in which embodiments described herein may be implemented is shown. The embodiments operate in the context of a data communication network including multiple network devices. The network includes a communication system comprising a media source 10 and receivers (clients) 12 in communication over a network 14. The network 14 may include one or more networks (e.g., local area network, metropolitan area network, wide area network, enterprise network, Internet, intranet, radio access network, public switched network, or any other network or combination of networks). The source 10 and receivers 12 are connected via communication links and one or more nodes. In FIG. 1, only one node (edge router 16) is shown interposed between the source 10 and receivers 12, however, the media flow path between the source and receivers may include any number or type of intermediate nodes (e.g., routers, switches, gateways, access nodes, or other network devices), which facilitate passage of data between the endpoints. The system may also include any number of sources 10 or receivers 12. For simplification, only two receivers 12 are shown in FIG. 1, however, the edge router 16 may transmit video content to any number of receivers 12.

The edge router 16 is also in communication with a video caching server 18, which may be positioned at the edge of a broadcast video delivery network, for example. Although the video caching server 18 is not in the data path itself, it still has knowledge of the popularity ranking and can make the link between content (channels) and multicast groups, based on the configuration of a channel line-up. As described below, the video caching server 18 may be used to improve the quality of the video experience for viewers in a network and has knowledge of the behavior of clients with regard to channels supplied to the receivers 12. The source 10 may be in communication with any number of video caching servers 18 and each server may service one or more edge routers 16.

The source 10 sends packets in a media stream to any combination of receivers 12 via the network 14. In the example shown in FIG. 1, source 10 transmits a media stream to edge router 16 on path 15. The media stream may include content such as audio, video, text, or other data. In one embodiment, Real-time Transport Protocol (RTP) is used to carry video packets over multicast streams from the source 10 to the receivers 12 and RTP Control Protocol (RTCP) is used to transmit statistics and control information between network devices. It is to be understood that the protocols described herein are only examples and that other protocols may be used without departing from the scope of the embodiments.

The source 10 and receiver 12 are configured to originate or terminate communications over the network 14. The source 10 and receiver 12 may be any device or combination of devices configured for receiving, transmitting, or receiving and transmitting media streams. The media source 10 may be, for example, a server that stores the media locally or receives the media from another server or media source via another network, satellite, cable, or any other communication device. The receiver 12 may be, for example, a personal computer, set-top box, personal digital assistant (PDA), VoIP phone, tablet, Internet connected television, cellular telephone, telepresence device, media center device, or any other network device that receives media packets.

The network device 16 may be any type of device configured for forwarding traffic from the source 10 to the receivers 12. It is to be understood that the term 'transmitting' as used herein may refer to transmitting video from the network device 16 or forwarding video received at the network device. In one embodiment, the network device 16 is an edge router configured to forward video traffic for a region serviced by the video caching server 18. The region may be a geographical region such as a city or state, or other network region. Each region is assigned one or more servers 18 and has a population of viewers. The server 18 may service multiple edge routers 16.

In one example, the server 18 is a Visual Quality of Experience (VQE) server operable to improve the quality of video experience for viewers in a given region of the network. The VQE server 18 receives a multicast stream for each channel from the source 10, via the edge router 16, and caches, for example, a few seconds of the most recently received program content for each channel. The VQE server 18 may provide various services to downstream clients such as error repair, rapid channel change, and statistics reporting. The server 18 may comprise software hosted on a content delivery system appliance, for example, and preferably maintains per-channel and per-component state information.

The VQE server 18 communicates with a VQE client (e.g., software component) integrated in the receiver 12 (e.g., set-top box) or other suitable device (e.g., home access gateway). The server 18 listens for inbound RTCP messages from downstream VQE clients. The messages may request services such as error repair or RCC (rapid channel change), or provide RTP receiver statistics. The server 18 responds to the client with appropriate action. For example, the VQE server 18 may use its cached video data to service retransmission requests from the client. If an error in video transmission occurs, the VQE client detects the packet loss and requests a retransmission while holding the video sequence in queue. The VQE server 18 automatically repairs the error by transmitting the missing packet, which is re-sequenced by the receiver 12 without interruption. The VQE client also notifies the VQE server 18 of a channel change request from the viewer.

It is to be understood that the VQE server and VQE client described herein are only examples and that other types of servers or clients may be used, without departing from the scope of the embodiments. Also, the services provided by the server 18 described above are only examples of services that may be provided by a video caching server 18.

Referring again to FIG. 1, the server 18 receives from the receivers 12, channel data 20 identifying the channels the users are viewing. This information is transmitted to the server 18 via the edge router 16. As described in detail below, the server 18 uses the channel data (e.g., popularity information) to calculate a priority for each channel. Content priority information 22 is stored at the server 18 and priority data 24 is transmitted to the edge router 16 (or source 10) for use in preserving quality of the most important video content.

The priority information 24 allows the edge router 16 to make informed decisions that result in preserved QoE (Quality of Experience) for the important channels and a lowered QoE for non-important channels. For example, when the edge router 16 experiences congestion, the router can drop packets associated with low priority channels since packet losses on popular channels may result in a large population of unhappy viewers, while the impact of packet loss for less popular channels may be minimal or go unnoticed. Dropping packets of less popular channels will also result in less retransmission requests from clients.

It is to be understood that the network shown in FIG. 1 and described herein is only an example and that the embodiments may be implemented in networks having different network topologies or network devices, without departing from the scope of the embodiments.

Figure 2:
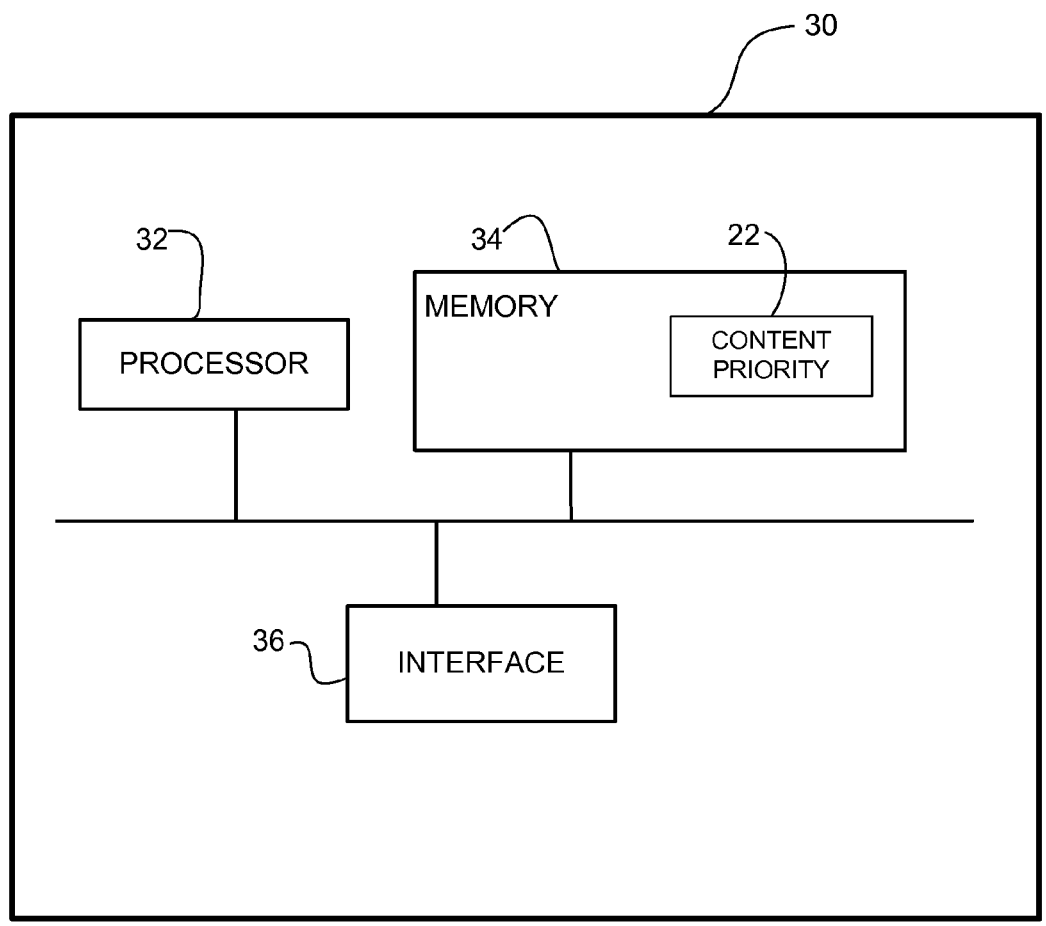
FIG. 2 depicts an example of a network device useful in implementing embodiments described herein.

FIG. 2 illustrates an example of a network device (e.g., video caching server) 30 that may be used to implement the embodiments described herein. In one embodiment, the network device 30 is a programmable machine that may be implemented in hardware, software, or any combination thereof. The network device 30 includes one or more processor 32, memory 34, and network interface 36. Memory 34 may be a volatile memory or non-volatile storage, which stores various applications, operating systems, modules, and data for execution and use by the processor 32. For example, memory 34 may store the content priority information 22.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise any number of interfaces (linecards, ports) for receiving data or transmitting data to other devices. The interface 36 may include, for example, an Ethernet interface for connection to a computer or network.

It is to be understood that the network device 30 shown in FIG. 2 and described above is only an example and that different configurations of network devices may be used. For example, the network device 30 may further include any suitable combination of hardware, software, algorithms, processors, devices, components, or elements operable to facilitate the capabilities described herein.

Figure 3:
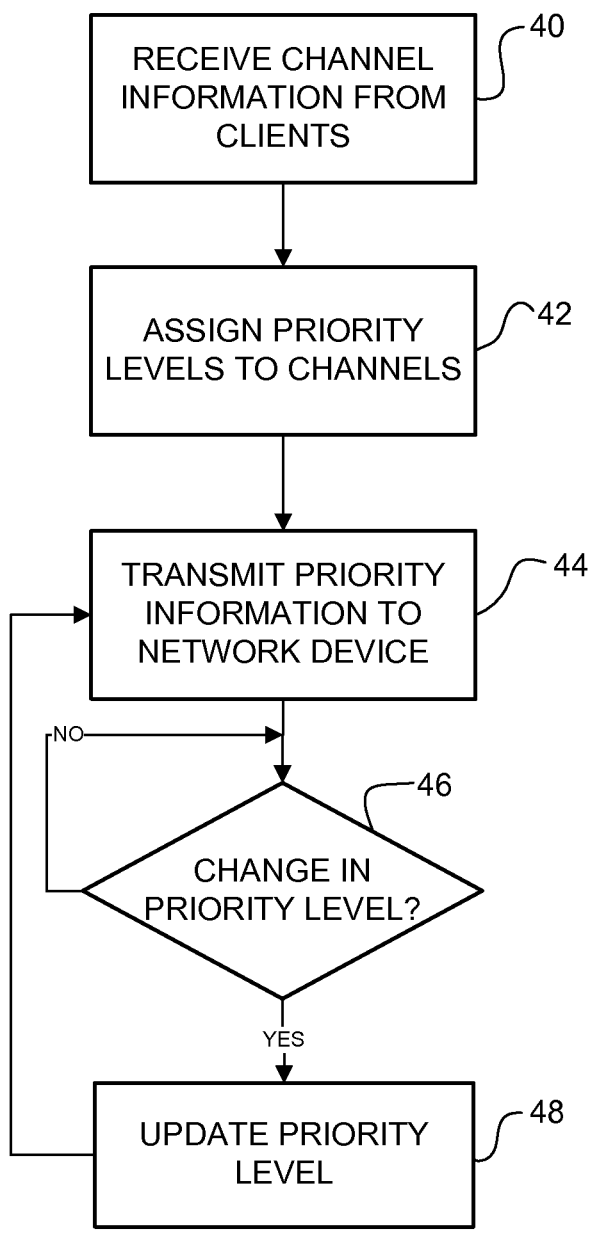
FIG. 3 is a flowchart illustrating an overview of a process for video content priority aware congestion management, in accordance with one embodiment.

FIG. 3 is a flowchart illustrating an overview of a process for providing content priority aware congestion management at the video caching server 18, in accordance with one embodiment. At step 40, the server 18 receives channel information (channel data 20 in FIG. 1) from receivers 12. The server 18 assigns priority levels to channels associated with video broadcast content (step 42). As described below, the priority levels are assigned based on channel information (e.g., popularity information) received at the server or other rules used to determine the importance (priority) of a channel. The server 18 transmits the assigned priority levels (priority data 24) to a network device (e.g., edge router 16, source 10) transmitting (i.e., transmitting or forwarding) the video broadcast content to the receivers 12 (step 44). The server 18 monitors the channel information 20 received from the receivers 12 and updates the assigned priority levels as required (steps 46 and 48). The edge router 16 applies a policy to the video broadcast content based on the assigned priority levels when network congestion occurs. The policy may comprise, for example, dropping packets containing video for low priority channels when the router experiences congestion.

It is to be understood that the process shown in FIG. 3 and described above is only an example and that steps may be added or modified without departing from the scope of the embodiments.

The channel information 20 provided to the server 18 includes details as to what channels the viewers are watching. For example, the VQE client at the receiver 12 may transmit a channel change request to the VQE server 18, thus providing channel information to the server. As previously discussed, the server 18 uses this channel information to calculate a priority level for each channel (video content, video stream).

In one embodiment, each channel is assigned one of three priorities (high, medium, or low) based on the current popularity. The priority levels may use default values or may be determined by an administrator. For example, if 80% of the viewer population is watching a channel, the channel may be assigned a high priority. If only 5% of the viewer population is watching a channel, the channel may be assigned a low priority. It is to be understood that these are only examples and that any number of priority levels or percentage of viewers for each priority level may be used.

The server 18 may continuously monitor the popularity ranking and perform calculations to determine popularity periodically (e.g., every five minutes or any other time period). The priority levels assigned to the channels may be updated based on a change in the popularity distribution. For example, if a channel shifts from one priority level to another, then the priority level assigned to that channel may be updated and new priority data 24 transmitted to the edge router 16 (or source 10).

Since the server 18 has knowledge of the popularity distribution within a region of the network, an administrator can configure rules on the server that determine what channels are the most important. In one embodiment, the most popular channels are defined as the most important ones. A provider may also choose other rules to determine the importance (priority) of a channel. Thus, the assignment of priority levels is not limited to the content popularity distribution.

In one embodiment, the priority level is configured by setting a specific DSCP (Differentiated Services Code Point) value in the IP packet. Differentiated services (Diffserv) allow traffic to be treated by intermediate systems with relative priority based on a field in the packet (see, for example, IETF RFC 2474, "Definition of the Differentiated Services Field (DS Field) in the IPv4 and IPv6 Headers", K. Nichols et al., December 1998). The Diffsery architecture defines an AF (Assured Forwarding) class (see, for example, IETF RFC 2597, "Assured Forwarding PHB Group", J. Heinanen et al., June 1999) with three different priority levels referred to as 'drop precedence' (three LSB (least significant bits) of the DSCP value). In one example, video broadcast traffic is assigned to an AF class and these three priority levels are configured on the streams in accordance with the content priority settings determined by the video caching server 18.

The DSCP value is used so that packets associated with lower priority channels will be dropped first. In one example, the edge router 16 first drops traffic with a low drop precedence value when it is experiencing congestion, thereby preserving traffic with medium and high drop precedence values. When more traffic needs to be dropped, traffic with medium drop precedence will also be dropped. The server 18 determines how many channels receive the low, medium, or high drop precedence value, as previously discussed.

The setting of the drop precedence in the DSCP field of the IP packet on the streams may be done at the source 10 impacting a global area or at the edge router 16 impacting a regional area. When done at the source 10, the server 18 may communicate using an RTCP/RTP connection that it has established with the source, for example (FIG. 1).

The priority information may be communicated from the server 18 to the edge router 16 via an API (application programming interface) or as a configuration change using a command line interface (CLI), for example. It is to be understood that these are only examples and that other mechanisms may be used to communicate the settings of the DSCP value from the server 18.

In one embodiment, the edge router 16 is configured to set (or change) the DSCP value of traffic arriving on its ingress (core facing) interface according to a priority level assigned to the channel by the server 18. The egress interface applies a policy in place for congestion and uses the DSCP value to select the traffic to drop, if needed. For example, there may be an overlay QoS policy in place to drop a percentage of the multicast traffic if congestion occurs.

If the edge router 16 already has a basic QoS configuration where it sets the DSCP on ingress and does the scheduling and dropping on the egress interface, then preferably only an IP access list defining the source and multicast destination IP addresses is configured by the server 18 in order to change the DSCP value. In this way, the server 18 can, on a regular basis, change only the IP access list entries in line with the current content popularity. This allows each edge router 16 to be configured with a different access list, based on the region that it serves.

As previously discussed, one source 10 may serve multiple regions, with each region having a different content popularity distribution. As each region has its own server 18, the content popularity for each region can be listed. Thus, each region gets the correct DSCP setting that is in line with the popularity for that region. The fact that one region can have multiple edge routers 16 and that these edge routers will get the same access list configuration is not an issue, even if they are not exactly forwarding the same streams, as the DSCP value determination is on a per region basis.

When the server 18 configures the router 16 with an access list to change the DSCP value for the different stream, the router can selectively drop the least important content first, thereby saving bandwidth and preserving the quality of the most important content.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
assigning at a server, priority levels to channels associated with video broadcast content, the server comprising a video caching server operable to cache recent program content for each of said channels;
transmitting said assigned priority levels and a policy for priority content aware congestion management to a router transmitting said video broadcast content from a source to receivers to configure the router based on said assigned priority levels;
monitoring at the server, channel information transmitted from the receivers and forwarded from the router to the server; and
updating at the server, said assigned priority levels based on said channel information;
receiving at the server, a multicast stream for each channel from the source via the router;
wherein said policy is applied to said video broadcast content at the router based on said assigned priority levels when network congestion occurs to preserve quality of important content as defined by said assigned priority levels, said policy identifying a percent of traffic to drop if congestion occurs such that packets are dropped based on a priority level of the associated channel at the router experiencing congestion; and
wherein the router is located in a communication path between a source of said video broadcast content and the receivers and the server is not within a direct communication path between the source and the receivers.

2. The method of claim 1 wherein said channel information comprises popularity information received from the receivers via the router.

3. The method of claim 2 wherein assigning priority levels comprises assigning a high priority to popular channels.

4. The method of claim 1 wherein assigning priority levels comprises assigning priority levels based on popularity of the channels and rules defined at the server.

5. The method of claim 1 wherein the router is configured to set Differentiated Services Code Point (DSCP) values based on said assigned priority levels and set on a per region basis.

6. The method of claim 1 wherein said assigned priority levels comprise high, medium, and low priority levels and wherein traffic with a low priority level is first dropped when network congestion occurs.

7. The method of claim 1 wherein assigning priority levels comprises configuring an access list for a region.

8. The method of claim 1 wherein the server communicates with clients at the receivers and receives RTCP (Real-time Transport Protocol (RTP) Control Protocol) messages from the clients.

9. The method of claim 1 wherein the server is in communication with a plurality of routers, each router associated with a different region, at least two of said regions assigned different priority levels.

10. An apparatus comprising:
a processor for assigning at a server, priority levels to channels associated with video broadcast content, transmitting said assigned priority levels and a policy for priority content aware congestion management to a router transmitting said video broadcast content from a source to receivers to configure the router based on said assigned priority levels, monitoring channel information transmitted from the receivers and forwarded from the router to the server, and updating said assigned priority levels based on said channel information; and
memory for storing said assigned priority levels;
wherein said policy is applied to said video broadcast content based on said assigned priority levels when network congestion occurs to preserve quality of important content as defined by said assigned priority levels, said policy identifying a percent of traffic to drop if congestion occurs such that packets are dropped based on a priority level of the associated channel at the router experiencing congestions; and
wherein the server comprises a video caching server operable to cache recent program content for each of said channels and receive a multicast stream for each channel from the source via the router while operating in a communication path that is not within a direct communication path between the source and the receivers.

11. The apparatus of claim 10 wherein said channel information comprises popularity information, the processor operable to calculate said priority levels based on said channel information.

12. The apparatus of claim 10 wherein transmitting said assigned priority levels to the router comprises configuring the router to set Differentiated Services Code Point (DSCP) values based on said assigned priority levels.

13. The apparatus of claim 10 wherein assigning priority levels comprises configuring an access list for a region.

14. The apparatus of claim 10 wherein the server is configured to service a region, and wherein the receivers in said region receive said video content from the router.

15. The apparatus of claim 10 wherein the server is operable to improve the quality of video experience for viewers of the video broadcast content in a specified region of a network by providing error repair, the server maintaining per-channel state information.

16. An apparatus comprising logic encoded on one or more non-transitory computer readable media for execution by a processor and when executed by the processor operable to:
assign at a server, priority levels to channels associated with video broadcast content, the server comprising a video caching server operable to cache recent program content for each of said channels and operable to receive a multicast stream for each channel from the source via a router;
transmit said assigned priority levels and a policy for priority content aware congestion management to the router transmitting said video broadcast content from a source to receivers to configure the router based on said assigned priority levels;
monitor at the server, channel information transmitted from the receivers and forwarded from the router to the server while operating in a communication path that is not within a direct communication path between the source and the receivers; and
update said assigned priority levels based on said channel information received at the server to preserve quality of important content as defined by said assigned priority levels, said policy identifying a percent of traffic to drop if congestion occurs such that packets are dropped based on a priority level of the associated channel at the router experiencing congestion;
wherein said policy is applied to said video broadcast content based on said assigned priority levels when network congestion occurs.

* * * * *